(12) United States Patent
Umei et al.

(10) Patent No.: US 8,319,891 B2
(45) Date of Patent: Nov. 27, 2012

(54) VIDEO DISPLAY DEVICE DISPLAYING INPUT VIDEOS IN VARIOUS SCREEN MODES AND/OR ASPECT RATIOS

(75) Inventors: Toshitomo Umei, Kanagawa (JP); Yuji Mizuguchi, Kanagawa (JP); Kazumasa Nagashima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1511 days.

(21) Appl. No.: 11/835,558

(22) Filed: Aug. 8, 2007

(65) Prior Publication Data

US 2008/0036907 A1 Feb. 14, 2008

Related U.S. Application Data

(60) Provisional application No. 60/876,989, filed on Dec. 26, 2006.

(30) Foreign Application Priority Data

Aug. 9, 2006 (JP) ................................. 2006-216884

(51) Int. Cl.
    *H04N 7/01* (2006.01)
(52) U.S. Cl. ...................................................... 348/445
(58) Field of Classification Search .................. 348/445, 348/556, 557, 558, 913, 564, 565, 561, 562
    See application file for complete search history.

(56) References Cited

U.S. PATENT DOCUMENTS

| | | | | |
|---|---|---|---|---|
| 5,309,234 A * | 5/1994 | Kranawetter et al. | ......... | 348/473 |
| 5,313,303 A * | 5/1994 | Ersoz et al. | ................. | 348/439.1 |
| 5,956,091 A * | 9/1999 | Drewery et al. | ............. | 348/445 |
| 6,733,136 B2 * | 5/2004 | Lantz et al. | ..................... | 353/79 |
| 7,292,284 B2 * | 11/2007 | Kim | ............................... | 348/564 |
| 7,304,685 B2 * | 12/2007 | Park et al. | ..................... | 348/556 |
| 7,349,062 B2 * | 3/2008 | Neil et al. | ........................ | 352/38 |
| 7,398,478 B2 * | 7/2008 | Wu et al. | ........................ | 715/800 |

(Continued)

FOREIGN PATENT DOCUMENTS

JP 7-135614 5/1995

OTHER PUBLICATIONS

English language Abstract of JP 7-135614.

*Primary Examiner* — Paulos M Natnael
(74) *Attorney, Agent, or Firm* — Greenblum & Bernstein, P.L.C.

(57) ABSTRACT

A video display device is provided with a video conversion circuit for extending an inputted video signal in horizontal and/or vertical directions, and a display unit including a display screen whose aspect ratio is longer in the horizontal direction than 16:9 and adapted to display the video extended by the video conversion circuit. The video conversion circuit includes a mode for extending the inputted video at a scaling factor of A, which is equal to or larger than 1, in the horizontal direction and at a scaling factor of B, which is equal to or larger than 1, in the vertical direction, so that videos effectively utilizing the aspect ratio of the video display device can be displayed while reducing incongruous feeling caused by the extension in the horizontal direction. Thus, an increase in the number of screen modes can be minimized, and modes capable of giving a remarkable sense of presence and modes capable of displaying right circles can be provided in the video display device with an aspect ratio of, e.g. 10:3.

18 Claims, 14 Drawing Sheets

| | TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|---|
| | | | | HORIZONTAL | VERTICAL | |
| (a) | 640 × 480 | 4 : 3 | 1300 × 480 | | | 112/63 (1.78) |
| (b) | 640 × 480 (360) | 16 : 9 | 1300 × 411 | | | 112/63 (1.78) |
| (c) | 640 × 480 (267) | 12 : 5 | 1300 × 305 | 128/63 (2.03) | 8/7 (1.14) | 112/63 (1.78) |
| (d) | 640 × 480 | 16 : 9 (SQUEEZE) | 1300 × 480 | | | 4/3 |
| (e) | 640 × 480 (355) | 12 : 5 (SQUEEZE) | 1300 × 405 | | | 4/3 |
| (f) | 640 × 480 (480) | 4 : 3 (SQUEEZE) | 980 × 480 | | | 4/3 |

U.S. PATENT DOCUMENTS

| | | | |
|---|---|---|---|
| 7,400,345 B2 * | 7/2008 | Cok | 348/173 |
| 7,400,360 B2 * | 7/2008 | Linzer | 348/564 |
| 7,420,620 B2 * | 9/2008 | Habas et al. | 348/565 |
| 7,693,352 B2 * | 4/2010 | Yamamoto | 382/300 |
| 7,941,001 B1 * | 5/2011 | Sahu et al. | 382/298 |
| 8,004,506 B2 * | 8/2011 | Suzuki | 345/204 |
| 2004/0145595 A1 * | 7/2004 | Bennett | 345/660 |
| 2006/0274195 A1 * | 12/2006 | Eshkoli | 348/445 |
| 2007/0147708 A1 * | 6/2007 | Lee | 382/298 |
| 2010/0188425 A1 * | 7/2010 | Mizuguchi | 345/660 |

* cited by examiner

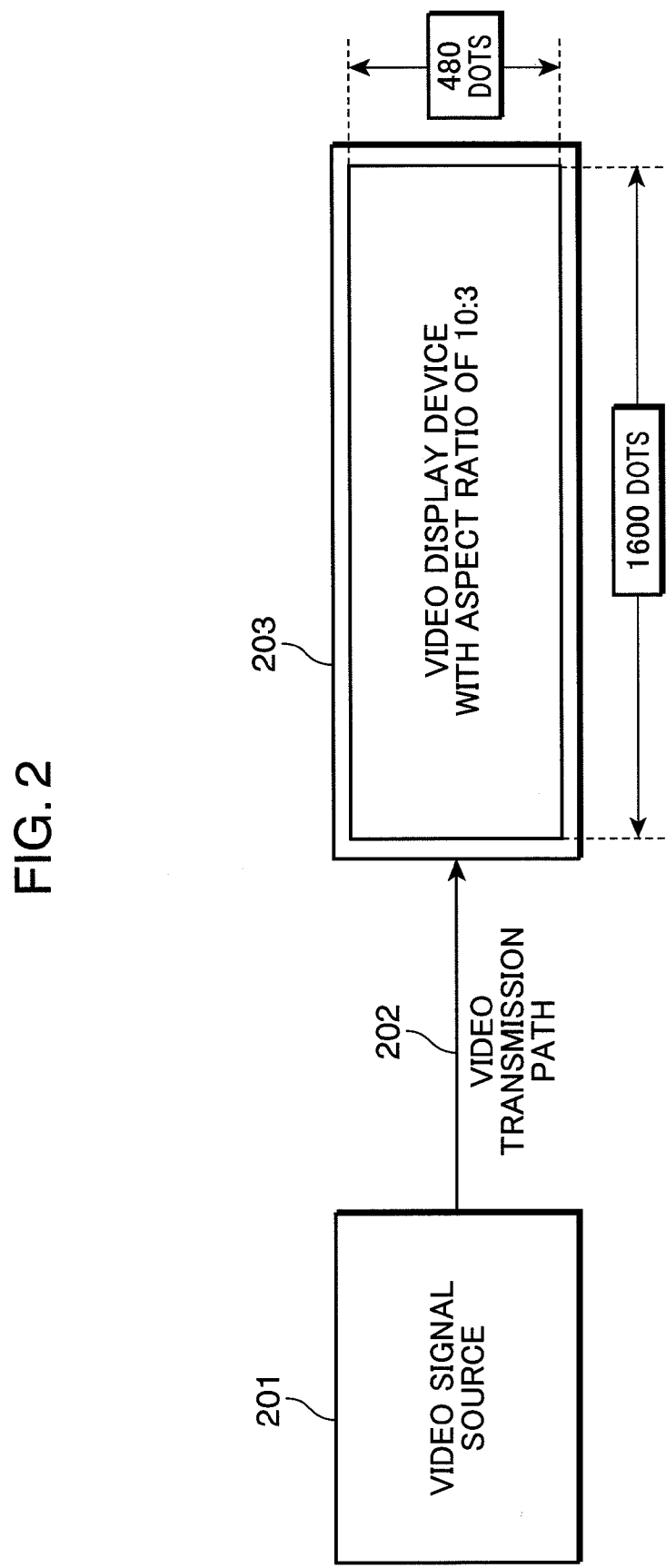

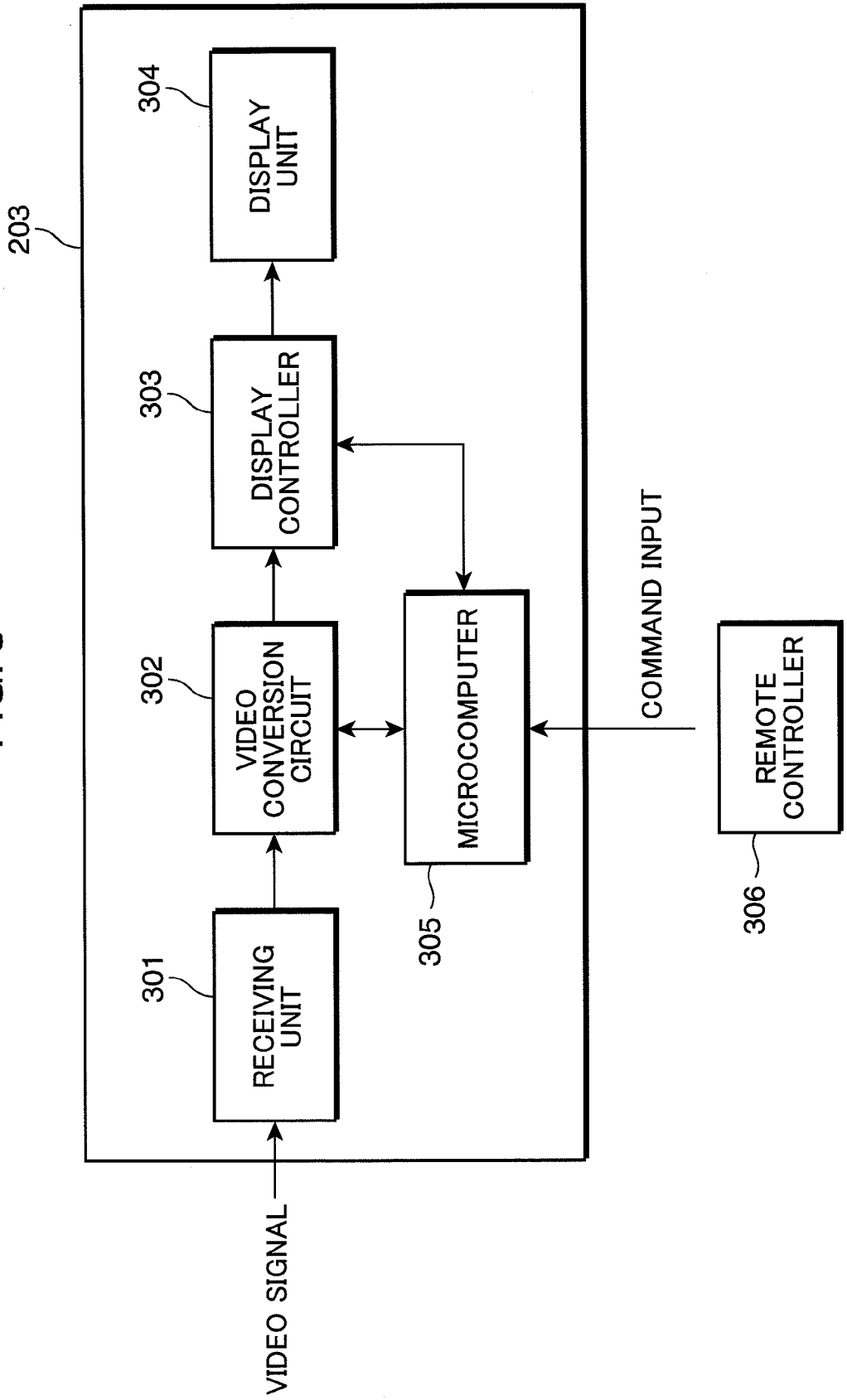

FIG. 4

| TRANSMISSION FORMAT | ASPECT RATIO OF CONTENT | SCALING FACTOR IN HORIZONTAL DIRECTION OF VIDEO ON TRANSMISSION PATH |
|---|---|---|
| (a) 640×480 | 4 : 3 | 1 |
| (b) 640×480, 360 | 16 : 9 | 1 |
| (c) 640×480, 267 | 12 : 5 | 1 |
| (d) 640×480 | 16 : 9 (SQUEEZE) | 3/4 |
| (e) 640×480, 355 | 12 : 5 (SQUEEZE) | 3/4 |
| (f) 640×480, 480 | 4 : 3 (SQUEEZE) | 3/4 |

FIG. 5

| | TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|---|
| | | | | HORIZONTAL | VERTICAL | |
| (a) | 640×480 | 4:3 | 640×480 | 1 | 1 | 1 |
| (b) | 640×480 (360) | 16:9 | 640×360 | | | 1 |
| (c) | 640×480 (267) | 12:5 | 640×267 | | | 1 |
| (d) | 640×480 | 16:9 (SQUEEZE) | 640×480 | | | 3/4 |
| (e) | 640×480 (355) | 12:5 (SQUEEZE) | 640×355 | | | 3/4 |
| (f) | 640×480 (480) | 4:3 (SQUEEZE) | 480×480 | | | 3/4 |

FIG. 6

| | TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|---|
| | | | | HORIZONTAL | VERTICAL | |
| (a) | 640×480 | 4:3 | 853×480 | 4/3 | 1 | 4/3 |
| (b) | 640×480 (360) | 16:9 | 853×360 | | | 4/3 |
| (c) | 640×480 (267) | 12:5 | 853×267 | | | 4/3 |
| (d) | 640×480 | 16:9 (SQUEEZE) | 853×480 | | | 1 |
| (e) | 640×480 (355) | 12:5 (SQUEEZE) | 853×355 | | | 1 |
| (f) | 640×480 (480) | 4:3 (SQUEEZE) | 640×480 | | | 1 |

FIG. 7

| | TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|---|
| | | | | HORIZONTAL | VERTICAL | |
| (a) | 640×480 | 4:3 | 1300×480 | 128/63 (2.03) | 8/7 (1.14) | 112/63 (1.78) |
| (b) | 640×480 (360) | 16:9 | 1300×411 | | | 112/63 (1.78) |
| (c) | 640×480 (267) | 12:5 | 1300×305 | | | 112/63 (1.78) |
| (d) | 640×480 | 16:9 (SQUEEZE) | 1300×480 | | | 4/3 |
| (e) | 640×480 (355) | 12:5 (SQUEEZE) | 1300×405 | | | 4/3 |
| (f) | 640×480 | 4:3 (SQUEEZE) | 980×480 | | | 4/3 |

FIG. 8

| | TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|---|
| | | | | HORIZONTAL | VERTICAL | |
| (a) | 640×480 | 4:3 | 1600×480 | | | 35/16 (2.19) |
| (b) | 640×480 (360) | 16:9 | 1600×411 | | | 35/16 (2.19) |
| (c) | 640×480 (267) | 12:5 | 1600×305 | 5/2 (2.5) | 8/7 (1.14) | 35/16 (2.19) |
| (d) | 640×480 | 16:9 (SQUEEZE) | 1600×480 | | | 105/64 (1.64) |
| (e) | 640×480 (355) | 12:5 (SQUEEZE) | 1600×405 | | | 105/64 (1.64) |
| (f) | 640×480 | 4:3 (SQUEEZE) | 1200×480 | | | 105/64 (1.64) |

FIG. 10

| TRANSMISSION FORMAT | ASPECT RATIO OF CONTENT | DISPLAY FORMAT | SCALING FACTOR OF VIDEO CONVERSION CIRCUIT | | SCALING FACTOR IN HORIZONTAL DIRECTION OF VIDEO ON TRANSMISSION PATH |
|---|---|---|---|---|---|
| | | | HORIZONTAL | VERTICAL | |
| (a) 640×480 | 4:3 | 1600×480 | 5/2 (2.5) | 1 | 5/2 (2.5) |
| (b) 640×480 (360) | 16:9 | 1600×360 | | | 5/2 (2.5) |
| (c) 640×480 (267) | 12:5 | 1600×267 | | | 5/2 (2.5) |
| (d) 640×480 | 16:9 (SQUEEZE) | 1600×480 | | | 15/8 (1.88) |
| (e) 640×480 (355) | 12:5 (SQUEEZE) | 1600×355 | | | 15/8 (1.88) |
| (f) 640×480 | 4:3 (SQUEEZE) | 1200×480 | | | 15/8 (1.88) |

PRIOR ART (a) NORMAL (b) WIDE (c) FULL (d) ZOOM

PRIOR ART

VIDEO DISPLAY DEVICE DISPLAYING INPUT VIDEOS IN VARIOUS SCREEN MODES AND/OR ASPECT RATIOS

This application is entitled to the benefit of Provisional Patent Application No. 60/876,989, filed in United States Patent and Trademark Office on Dec. 26, 2006.

In addition, this application is based on Japanese patent application serial No. 2006-216884, filed in Japan Patent Office on Aug. 9, 2006, the contents of which are hereby incorporated by reference.

BACKGROUND OF THE INVENTION

1. Field of the Invention

The present invention relates to a video display device for displaying input videos with aspect ratios of 4:3 and 16:9 on a screen longer in a horizontal direction than the one with an aspect ratio of 16:9, e.g. a screen with an aspect ratio of 10:3 in various screen modes.

2. Description of Background Art

A conventional video display device with an aspect ratio of 16:9 is disclosed, for example, in Japanese Unexamined Patent Publication No. H07-135614. This video display device displays an input video with an aspect ratio of 4:3 such as an image of an NTSC video signal in screen modes as shown in FIGS. 13A to 13D.

FIG. 13A shows a state, in the case of a normal screen mode, where an NTSC video NA with an aspect ratio of 4:3 is displayed with accurate circularity without displaying any video at the opposite sides in a horizontal direction of the video display device by conforming the vertical length of the video NA and that of a wide screen WD to each other.

FIG. 13B shows a state, in the case of a wide screen mode, where the NTSC video with an aspect ratio of 4:3 is displayed in conformity with the screen of the video display device with an aspect ratio of 16:9 by displaying the video with an aspect ratio of 4:3 with accurate circularity at a central part of the inputted video while extending the video in a horizontal direction at the opposite sides in the horizontal direction of the video display device.

FIG. 13C shows a state, in the case of a full screen mode, where the NTSC video with an aspect ratio of 4:3 is entirely extended in a transverse or horizontal direction, thereby being displayed in conformity with the video display device with an aspect ratio of 16:9.

FIG. 13D shows a state, in the case of a zoom screen mode, where the NTSC video NA with an aspect ratio of 4:3 is displayed with accurate circularity without displaying any video at the upper and lower sides of the video display device by conforming the horizontal length of the video NA and that of the wide screen WD to each other.

In the conventional video display device with an aspect ratio of 16:9, any desired one of the four screen modes shown in FIGS. 13A to 13D can be, for example, selected, and an NTSC video with an aspect ratio of 4:3 can be displayed in the selected screen mode.

FIG. 14 shows the transition of the screen modes. The respective screen modes shown in FIGS. 13A to 13D are caused to transit from one to another by a toggle, whereby the desired screen mode can be selected to display the NTSC video with an aspect ratio of 4:3.

However, since the aspect ratio is 16:9 in the conventional video display device, there has been a problem of an insufficient number of display aspects with the conventional screen modes in such a video display device laterally longer than the conventional video display device, e.g. the one with an aspect ratio of 10:3.

SUMMARY OF THE INVENTION

An object of the present invention is to realize screen modes capable of giving a sense of presence and screen modes capable of displaying with accurate circularity while maximally suppressing an increase of screen modes in a video display device whose aspect ratio is longer in a horizontal direction than 16:9.

One aspect of the present invention is directed to a video display device, comprising a video conversion circuit for extending an inputted video in horizontal and/or vertical directions; and a display unit including a display screen whose aspect ratio is longer in the horizontal direction than 16:9 and adapted to display the video extended by the video conversion circuit, wherein the video conversion circuit includes a mode for extending the inputted video at a scaling factor of A, which is equal to or larger than 1, in the horizontal direction and at a scaling factor of B, which is equal to or larger than 1, in the vertical direction.

These and other objects, features, aspects and advantages of the present invention will become more apparent upon a reading of the following detailed description with reference to accompanying drawings.

BRIEF DESCRIPTION OF THE DRAWINGS

FIG. 2 is a construction diagram of a system using the video display device according to the first embodiment of the invention, FIG. 3 is a construction diagram of the video display device according to the first embodiment of the invention, FIG. 4 is a table showing transmission formats of a video signal in the first embodiment of the invention, FIG. 5 is a table showing display formats at the time of a normal mode in the first embodiment of the invention, FIG. 6 is a table showing display formats at the time of a half/full mode in the first embodiment of the invention, FIG. 7 is a table showing display formats at the time of a zoom 1 mode in the first embodiment of the invention, FIG. 8 is a table showing display formats at the time of a zoom 2 mode in the first embodiment of the invention, FIG. 10 is a table showing display formats at the time of a full mode in a second embodiment of the invention.

DESCRIPTION OF PREFERRED EMBODIMENTS

Hereinafter, embodiments of a video display device according to the present invention are described with reference to the accompanying drawings.

First Embodiment

Figure 1A:
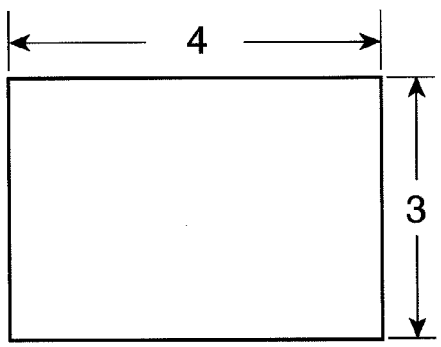
FIGS. 1A to 1C are diagrams showing aspect ratios of display units of video display devices according to a first embodiment of the invention.
Figure 1B:
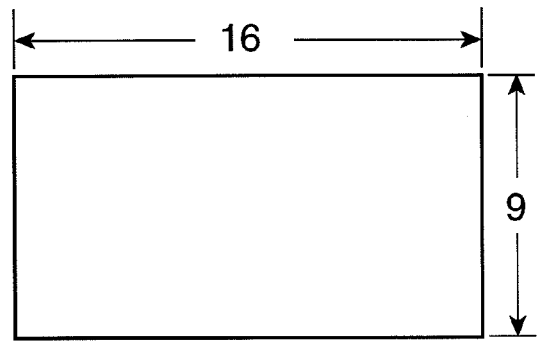
Figure 1C:
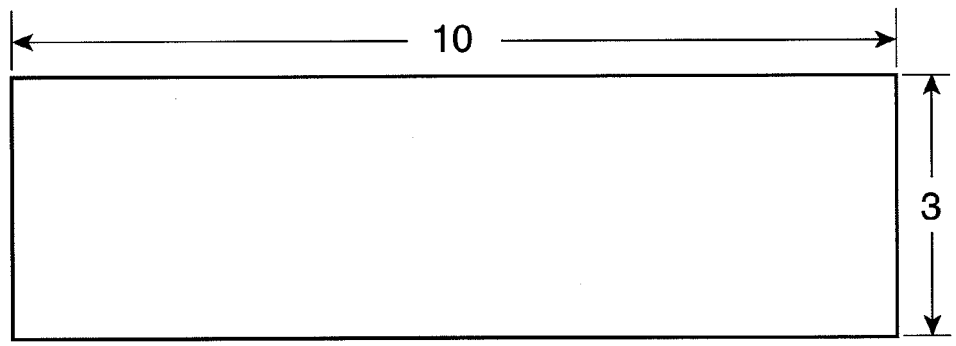

FIGS. 1A to 1C are diagrams showing aspect ratios of display units of video display devices according to a first embodiment of the invention.

FIG. 1A shows the display unit of the video display device with an aspect ratio of 4:3, FIG. 1B shows the display unit of the video display device with an aspect ratio of 16:9 and FIG. 1C shows the display unit of the video display device with an aspect ratio of 10:3 further longer in a horizontal direction.

FIG. 2 is a construction diagram of a system using the video display device according to the first embodiment of the invention. In FIG. 2, identified by 201 is a video signal source, which corresponds to a DVD player or TV tuner.

Identified by 203 is the video display device having a display screen with an aspect ratio of 10:3, wherein the numbers of pixels in horizontal and vertical directions of the video display device 203 are 1600 and 480 respectively, and the video display device 203 has a size of two WVGAs (800×480). Identified by 202 is a video transmission path. A video signal is transmitted from the video signal source 201 to the video display device 203 via an NTSC terminal or D terminal to display a video.

FIG. 3 is a construction diagram of the video display device 203 shown in FIG. 2. Identified by 301 is a receiving circuit for receiving the video signal, by 302 a video conversion circuit for extending a video in the horizontal direction and/or vertical direction, and by 303 a display controller. The display controller 303 generates a timing signal and a video signal at specified timings and sends them to a display unit 304.

Identified by 305 is a microcomputer, which changes control signals representing the extension of the video in the horizontal direction and/or vertical direction for the video conversion circuit 302 and timing signals to be outputted to the display controller 303. Identified by 306 is a remote controller, from which the microcomputer 305 receives a control signal representing a user operation to change the operation of the video display device 203.

Although a user remotely operates the video display device 203 by means of the remote controller 306 in this embodiment, the user may operate the video display device 203, for example, by means of a touch panel or a key provided in the video display device 203 itself instead of by means of the remote controller 306.

The operation of the video display device constructed as above is described.

FIG. 4 is a table showing transmission formats of a video signal transmitted from the video signal source 201 to the video display device 203 via the video transmission path 202. Transmission formats (a) to (f) are assumed. It is assumed that the video signal is transmitted in the form of an NTSC signal with a 4:3 format and the video signal with an aspect ratio of 4:3 is converted into a signal with a VGA size of 640 pixels×480 pixels after being received by the receiving circuit 301. Here, description is given, assuming that the video signal with the 4:3 format is of the size 640×480.

In (a) to (c) of FIG. 4, the scaling factor of the video in the horizontal direction is 1 and a circle in the center of video shown in FIG. 4 is transmitted as a right circle. (a) is a video with an aspect ratio of 4:3, (b) is a video with an aspect ratio of 16:9, and (c) is a cinemascope video with an aspect ratio of 12:5.

In (d) to (f) of FIG. 4, the scaling factor of the video in the horizontal direction is 0.75 and the circle in the center of video shown in FIG. 4 is transmitted as a vertically long circle (squeeze). (d) is a video with an aspect ratio of 16:9, (e) is a cinemascope video with an aspect ratio of 12:5 and (f) is a video with an aspect ratio of 4:3 in a vertically long area.

(a) to (f) of FIG. 4 are video output formats of a DVD player or digital terrestrial broadcasting tuner, wherein (a) to (c) are formats to be viewed on the video display device with an aspect ratio of 4:3 and the video can be displayed with accurate circularity by being displayed on the video display device with an aspect ratio of 4:3.

On the other hand, on the video display device with an aspect ratio of 16:9, the video can be displayed with accurate circularity by being displayed with an aspect ratio of 4:3 only in the center without being displayed at the opposite sides in the horizontal direction of the display unit in a normal mode. Alternatively, the video can be displayed on the display unit with an aspect ratio of 16:9 in a wide or full mode. (d) to (f) are formats to be viewed on the video display device with an aspect ratio of 16:9 and the video can be displayed with accurate circularity by being displayed in the full mode in the video display device with an aspect ratio of 16:9.

The video signal is inputted in the 4:3 transmission format shown in (a) to (f) of FIG. 4 to the video display device 203 via the video transmission path 202. In the video display device 203, the video signal received by the receiving circuit 301 is converted into a signal with the VGA size of 640 pixels×480 pixels. 640 pixels×480 pixels is a ratio of 4:3, and the video is extended neither in the horizontal direction nor vertical direction in the receiving circuit 301.

FIG. 5 is a table showing display formats on the display unit 304 at the time of the normal mode. At the time of the normal mode, the video conversion circuit 302 does not extend the video either in the horizontal direction or vertical direction. Thus, videos (a) to (f) made up of 640 pixels×480 pixels inputted as shown in FIG. 5 via the display controller 303 are displayed in the central part of the display unit 304 having 1600 pixels×480 pixels. No video is displayed at the opposite sides in the horizontal direction of the display unit 304 respectively having 480 pixels×480 pixels.

Since the 4:3 squeezed video shown in (f) has areas containing no video at the opposite sides in a horizontal direction thereof in its transmission format, additional areas displaying no video are present at the opposite sides in the horizonrtal direction of the display unit 304. Further, since the video with an aspect ratio of 16:9 in (b), the cinemascope video with an aspect ratio of 12:5 in (c) and the cinemascope video squeezed with an aspect ratio of 12:5 in (e) have areas containing no video at the upper and lower sides in their transmission formats, areas displaying no video are present at the upper and lower sides of the display unit 304. At the time of the normal mode, the videos having a scaling factor of 1 in the horizontal direction shown in (a) to (c) are displayed with accurate circularity.

FIG. 6 is a table showing display formats on the display unit 304 at the time of the half/full mode. At the time of the half/full mode, the video conversion circuit 302 extends the video at a scaling factor of 4/3 only in the horizontal direction. Thus, videos (a) to (f) made up of 640 pixels×480 pixels inputted as shown in FIG. 6 via the display controller 303 are converted into a video made up of 853 pixels×480 pixels and displayed in the central part of the display unit 304 having 1600 pixels×480 pixels. No video is displayed at the opposite sides in the horizontal direction of the display unit 304.

Since the 4:3 squeezed video shown in (f) has areas containing no video at the opposite sides in horizontal direction thereof in its transmission format, additional areas displaying no video are present at the opposite sides in the horizontal direction of the display unit 304. Further, since the video with an aspect ratio of 16:9 in (b), the cinemascope video with an aspect ratio of 12:5 in (c) and the cinemascope video squeezed with an aspect ratio of 12:5 in (e) have areas containing no video at the upper and lower sides in their transmission formats, areas displaying no video are present at the upper and lower sides of the display unit 304.

At the time of the half/full mode, the squeezed videos shown in (d) to (f) are displayed with accurate circularity. The videos having a scaling factor of 1 in the horizontal direction shown in (a) to (c) are displayed with a scaling factor of 4/3 in the horizontal direction. This scaling factor of 4/3 is the same enlargement factor when a video with an aspect ratio of 4:3 is fully displayed on a video display device with an aspect ratio of 16:9, and is free from incongruous feeling caused by the extension when the video is viewed.

FIG. 7 is a table showing display formats on the display unit 304 at the time of the zoom 1 mode. At the time of the zoom 1 mode, the video conversion circuit 302 extends the video at a scaling factor of 128/63 in the horizontal direction and at a scaling factor of 8/7 in the vertical direction. Thus, videos (a) to (f) made up of 640 pixels×480 pixels inputted as shown in FIG. 7 via the display controller 303 are converted into videos made up of 1300 pixels×549 pixels, only a video part corresponding to 480 lines in the central part out of the 549 lines along the vertical direction is selected, and the selected video part is displayed as a video made up of 1300 pixels×480 pixels in the central part of the display unit 304 having 1600 pixels×480 pixels. No video is displayed at the opposite sides in the horizontal direction of the display unit 304.

Since the 4:3 squeezed video shown in (f) has areas containing no video at the opposite sides in a horizontal direction thereof in its transmission format, additional areas displaying no video are present at the opposite sides in the horizontal direction of the display unit 304. Further, since the video with an aspect ratio of 16:9 in (b), the cinemascope video with an aspect ratio of 12:5 in (c) and the cinemascope video squeezed with an aspect ratio of 12:5 in (e) have areas containing no video at the upper and lower sides in their transmission formats, areas displaying no video present at the upper and lower sides of the display unit 304 decrease in their width by the extension in the vertical direction.

At the time of the zoom 1 mode, the videos having a scaling factor of 1 in the horizontal direction and shown in (a) to (c) come to have a scaling factor of 112/63 (1.78) and can be displayed with less incongruous feeling caused by the extension when being viewed. Thus, the zoom 1 mode can display powerful videos effectively using the display unit 304 with an aspect ratio of 10:3. Further, the squeezed videos shown in (d) to (f) are displayed at a scaling factor of 4/3 in the horizontal direction. This scaling factor of 4/3 is the same enlargement factor when a video with an aspect ratio of 4:3 is fully displayed on a video display device with an aspect ratio of 16:9, and is free from incongruous feeling caused by the extension when the video is viewed.

FIG. 8 is a table showing display formats on the display unit 304 at the time of the zoom 2 mode. At the time of the zoom 2 mode, the video conversion circuit 302 extends the video at a scaling factor of 5/2 in the horizontal direction and at a scaling factor of 8/7 in the vertical direction. Thus, videos (a) to (f) made up of 640 pixels×480 pixels inputted as shown in FIG. 8 via the display controller 303 are converted into videos made up of 1600 pixels×549 pixels, only a video part corresponding to 480 lines in the central part out of the 549 lines along the vertical direction is selected, and the selected video part is displayed as a video made up of 1600 pixels×480 pixels on the display unit 304 having 1600 pixels×480 pixels.

Since the 4:3 squeezed video shown in (f) has areas containing no video at the opposite sides in a horizontal direction in its transmission format, additional areas displaying no video are present at the opposite sides in the horizontal direction of the display unit 304. Further, since the video with an aspect ratio of 16:9 in (b), the cinemascope video with an aspect ratio of 12:5 in (c) and the cinemascope video squeezed with an aspect ratio of 12:5 in (e) have areas containing no video at the upper and lower sides in their transmission formats, areas displaying no video present at the upper and lower sides of the display unit 304 decrease in their width by the extension in the vertical direction.

At the time of the zoom 2 mode, the videos having a scaling factor of 1 in the horizontal direction and shown in (a) to (c) come to have a scaling factor of 35/16 (2.19). Thus, powerful videos can be displayed effectively using the display unit 304 with an aspect ratio of 10:3 while less incongruous feeling caused by the extension is given when the videos are viewed. Further, the squeezed videos shown in (d) to (f) are displayed at a scaling factor of 105/64 (1.64) in the horizontal direction, and can be displayed with less incongruous feeling caused by the extension while being viewed. Thus, powerful videos can be displayed effectively using the display unit 304 with an aspect ratio of 10:3.

Such a video display device of the first embodiment of the present invention whose aspect ratio is longer in the horizontal direction than 16:9 is provided with the video conversion circuit 302 for extending the inputted video signal in the horizontal direction and vertical direction, and the display unit 304 for displaying the video extended by the video conversion circuit 302, wherein the video conversion circuit 302 has the mode for extending the inputted video at a scaling factor of A (A is equal to or larger than 1) in the horizontal direction and at a scaling factor of B (B is equal to or larger than 1) in the vertical direction. Thus, video signals transmitted in various transmission formats can be displayed with accurate circularity and can also be displayed at a scaling factor of 4/3 free from incongruous feeling caused by the extension while being viewed. Further, hard-edges videos can be displayed at scaling factors of 112/63 (1.78) and 105/64 (1.64) effectively utilizing the display unit 304 with an aspect ratio of 10:3.

As described above, the input video is extended at a scaling factor of 8/7 in the in the zoom 1 mode and zoom 2 mode. This value is based on the following grounds. First of all, the applicant of the present application found out, as a result of checking huge numbers of DVDs containing cinemascope videos and Vista videos, that subtitles added to most of cinemascope videos and Vista videos entirely fell within screens even if the cinemascope videos and Vista videos were extended at a scaling factor of 8/7 in the vertical direction. Thus, it is no longer necessary, for example, to mount a known subtitle detecting circuit by setting the scaling factor in the vertical direction to 8/7 beforehand.

Figure 9:
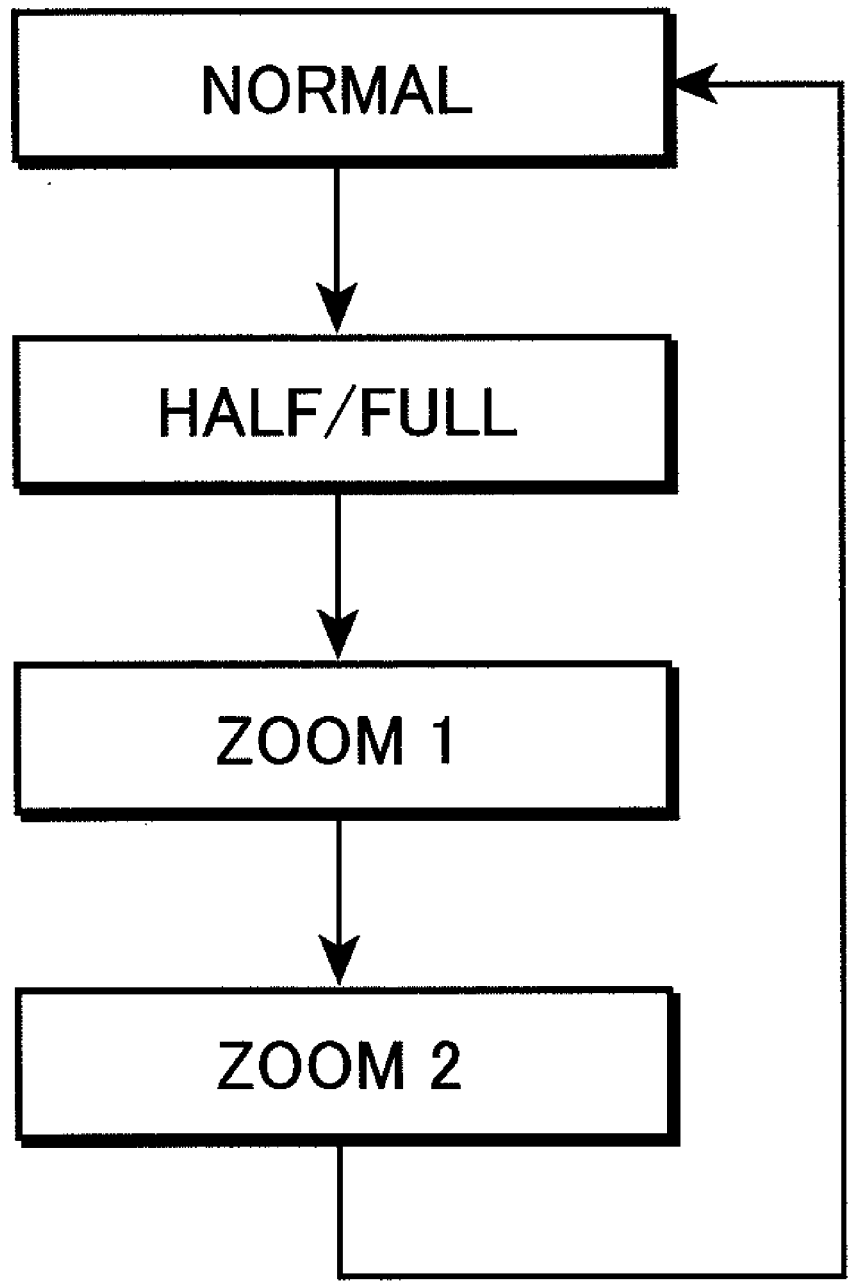
FIG. 9 is a diagram showing the transition of the screen modes of the video display device according to the first embodiment of the invention.

FIG. 9 is a diagram showing the transition of screen modes of the video display device. Upon the receipt of an input from the remote controller 306, the respective modes shown in FIGS. 5 to 8, i.e. the normal mode, half/full mode, zoom 1 mode and zoom 2 mode are caused to transmit from one to another, whereby a desired screen mode can be easily selected according to the video and the video can be viewed. Only with the four modes, the respective videos can be displayed with accurate circularity and can also be displayed at a scaling factor of 4/3 free from incongruous feeling caused by the extension while being viewed. Thus, powerful videos can be displayed at such a scaling factor effectively utilizing the display unit 304 with an aspect ratio of 10:3. By adopting five kinds of display aspects as described above, an increase of the screen mode number can be minimized and modes capable of giving a remarkable sense of presence and modes capable of displaying right circles can be provided.

Second Embodiment

Next, a video display device according to a second embodiment of the present invention is described with reference to FIG. 10. Since the construction of the video display device according to this embodiment is the same as that of the video display device shown in FIG. 3, characterizing parts of this embodiment are described with reference to FIG. 3 without showing the same construction anew.

FIG. 10 is a table showing display formats on a display unit 304 at the time of a full mode. At the time of the full mode, a video conversion circuit 302 extends a video at a scaling factor of 5/2 only in the horizontal direction. Thus, videos (a) to (f) made up of 640 pixels×480 pixels inputted as shown in FIG. 10 via a display controller 303 are converted into videos made up of 1600 pixels×480 pixels and displayed on the display unit 304 having 1600 pixels×480 pixels.

Since a 4:3 squeezed video shown in (f) has areas containing no video at the opposite sides in a horizontal direction thereof in its transmission format, areas displaying no video are present at the opposite sides in the horizontal direction of the display unit 304. Further, since a video with an aspect ratio of 16:9 in (b), a cinemascope video with an aspect ratio of 12:5 in (c) and a cinemascope video squeezed with an aspect ratio of 12:5 in (e) have areas containing no video at the upper and lower sides in their transmission formats, areas displaying no video are present at the upper and lower sides of the display unit 304.

At the time of the full mode, the videos having a scaling factor of 1 in the horizontal direction shown in (a) to (c) are displayed at a scaling factor of 5/2 in the horizontal direction. Further, the squeezed videos shown in (d) to (f) are displayed at a scaling factor of 15/8 (1.88) in the horizontal direction. Since the videos are not extended in the vertical direction as in the zoom 1 mode shown in FIG. 7 and the zoom 2 mode shown in FIG. 8, none of the inputted video signals in all the formats shown in FIG. 4 is displayed without being cut and powerful videos can be displayed effectively utilizing the display unit 304 with an aspect ratio of 10:3. Further, upon operating a menu screen of a video signal source such as a DVD player or TV tuner, the menu screen is displayed on the entire display unit 304 with an aspect ratio of 10:3, wherefore very easy operation environments can be provided.

As described above, the video display device according to the second embodiment of the present invention is provided with the video conversion circuit 302 for extending an inputted video signal in the horizontal and vertical directions, and the display unit 304 for displaying the video extended by the video conversion circuit 302, wherein the video conversion circuit 302 further includes the mode for stitching the inputted video at a scaling factor of C (C is equal to or larger than 1) only in the horizontal direction. Thus, powerful videos effectively utilizing the display unit with an aspect ratio of 10:3 can be displayed without being cut from video signals transmitted in various transmission formats. Further, upon operating the menu screen of the video signal source such as a DVD player or TV tuner, the menu screen is displayed on the entire display unit 304 with an aspect ratio of 10:3, wherefore very easy operation environments can be provided.

Figure 11:
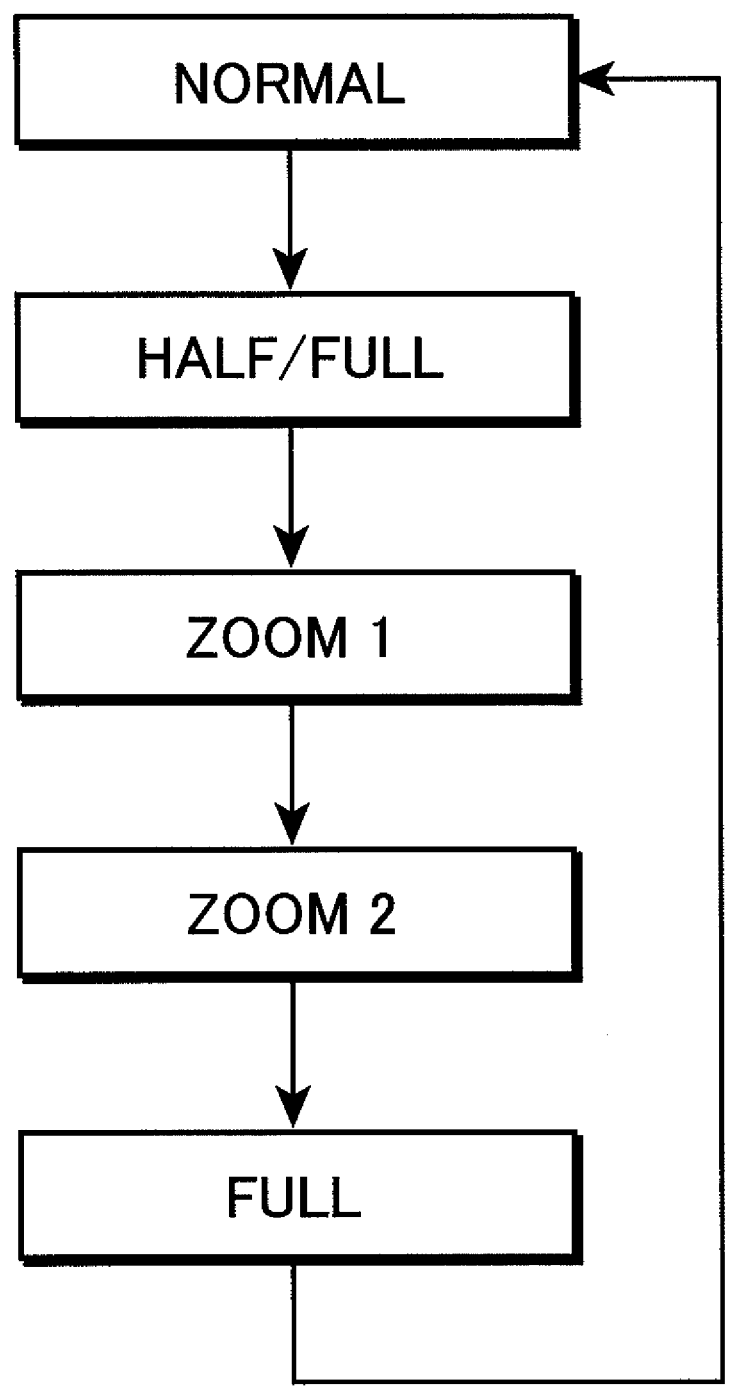
FIG. 11 is a diagram showing the transition of the screen modes of the video display device according to the second embodiment of the invention.

FIG. 11 is a diagram showing the transition of screen modes of the video display device. Upon the receipt of an input from a remote controller 306, the respective modes shown in FIGS. 5 to 8 and FIG. 10, i.e. the normal mode, half/full mode, zoom 1 mode, zoom 2 mode and full mode are caused to transmit from one to another, whereby a desired screen mode can be easily selected according to the video and the video can be viewed. Only with the five modes, the respective videos can be displayed with accurate circularity and can also be displayed at a scaling factor of 4/3 free from incongruous feeling caused by the extension while being viewed. Thus, powerful videos can be displayed at such a scaling factor effectively utilizing the display unit 304 with an aspect ratio of 10:3. Further, very easy operation environments can be provided on a menu screen.

Figure 12:
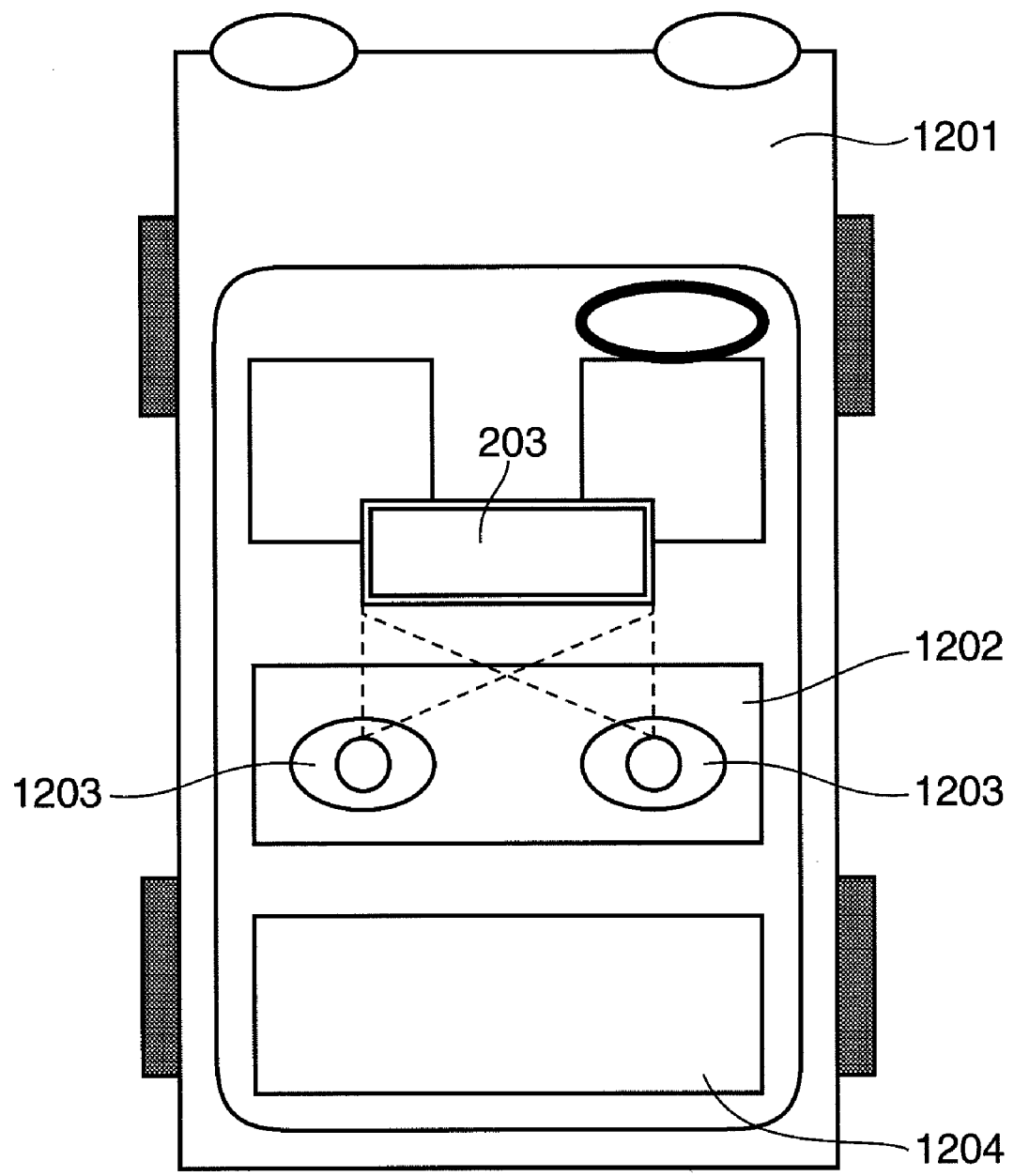
FIG. 12 is a diagram showing the attachment of the video display device according to the first or second embodiment of the invention to a vehicle.
Figure 13A:
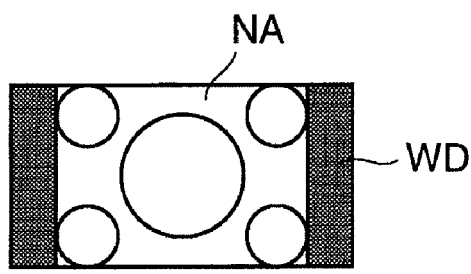
FIGS. 13A to 13D are diagrams showing screen modes of a conventional video display device.
Figure 13B:
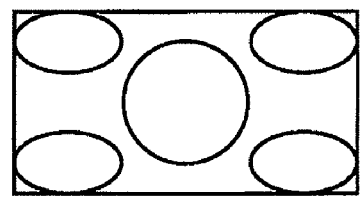
Figure 13C:
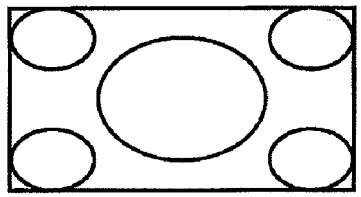
Figure 13D:
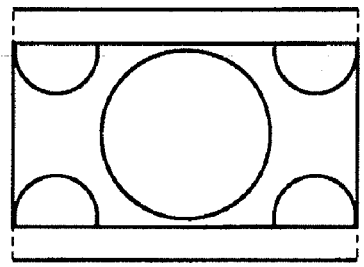
Figure 14:
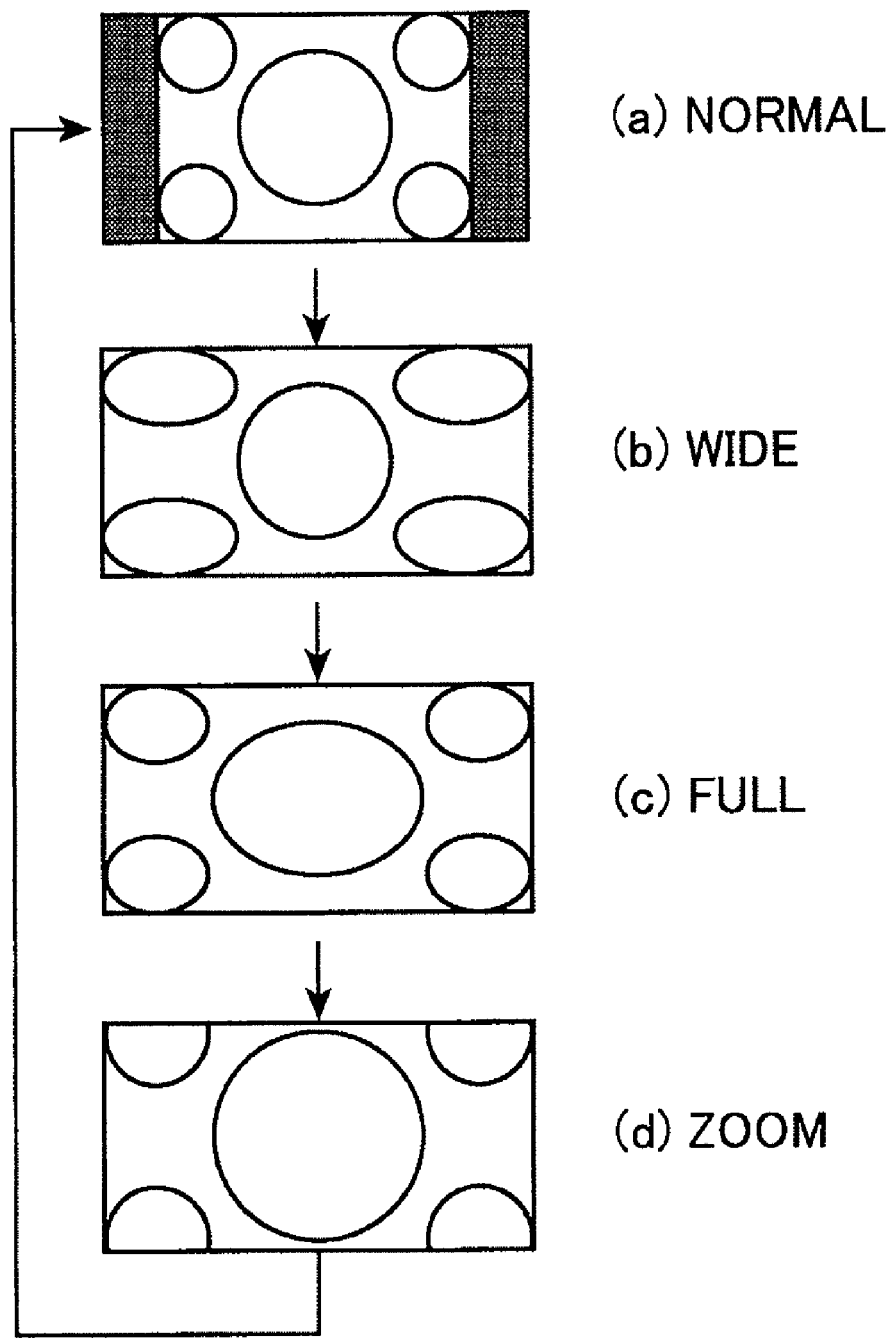
FIG. 14 is a diagram showing the transition of the screen modes of the conventional video display device.

FIG. 12 is a diagram showing the attachment of the video display device according to the first or second embodiment of the invention to a vehicle. In FIG. 12, identified by 1201 is a vehicle, by 1202 passenger seats in the second row, by 1204 passenger seats in the third row, by 1203 passengers in the seats of the second row, and by 203 a video display device with an aspect ratio of 10:3.

It is assumed that the video display device 203 is fixed while being hung from the ceiling of the vehicle 1201 between the passenger seats of the first row and those of the second row. It is also assumed that the video display device 203 is mounted in a transverse middle part of the vehicle 1201. A video displayed on the video display device 203 is displayed while being extended in the horizontal direction. In the vehicle 1201, the passenger 1203 in the seat of the second row seats himself in either the left or right passenger seat 1202 in the second row and obliquely sees the video displayed on the video display device 203. Thus, incongruous feeling caused by the extension while being viewed can be further decreased. The video display device 203 has a laterally long shape so as not to hinder the backward vision of a driver of the vehicle 1201 via a back mirror.

The present invention is summarized from the above respective embodiments as follows. Specifically, a video display device according to the present invention comprises a video conversion circuit for extending an inputted video signal in horizontal and vertical directions; and a display unit including a display screen whose aspect ratio is longer in the horizontal direction than 16:9 and adapted to display the video extended by the video conversion circuit, wherein the video conversion circuit includes a mode for extending the inputted video at a scaling factor of A (A is equal to or larger than 1) in the horizontal direction and at a scaling factor of B (B is equal to or larger than 1) in the vertical direction.

In this video display device, it is possible to reduce incongruous feeling caused by the extension in the horizontal direction and display powerful videos effectively utilizing the laterally long aspect ratio upon displaying videos on the video display device whose aspect ratio is longer in the horizontal direction than 16:9.

The scaling factor A in the horizontal direction is preferably larger than the scaling factor B in the vertical direction.

In this case, due to the extension in the vertical direction, incongruous feeling caused by the extension in the horizontal direction can be further reduced.

The video conversion circuit preferably includes a plurality of modes for extending the inputted video in the horizontal and vertical directions.

In this case, incongruous feeling caused by the extension in the horizontal direction can be more reduced since the video can be extended stepwise in the horizontal and vertical direction.

The scaling factor A in the horizontal direction is preferably determined by (a number of pixels of the display unit in the horizontal direction)/(a number of pixels of the inputted video in the horizontal direction).

In this case, the inputted video can be maximally displayed in the horizontal direction.

The video conversion circuit preferably further includes a mode for extending the inputted video at a scaling factor of C (C is equal to or larger than 1) only in the horizontal direction.

In this case, the entire inputted video can be displayed and a powerful video effectively utilizing the laterally long aspect ratio can be displayed by enlarging the display of the inputted video in the horizontal direction.

The video conversion circuit preferably includes a plurality of modes for extending the inputted video only in the horizontal direction.

In this case, incongruous feeling caused by the extension in the horizontal direction can be more reduced since the extension of the video only in the horizontal direction can be performed stepwise.

The scaling factor C in the horizontal direction is preferably determined by (a number of pixels of the display unit in the horizontal direction)/(a number of pixels of the inputted video in the horizontal direction).

In this case, the inputted video can be maximally displayed in the horizontal direction.

The video conversion circuit preferably further includes a mode for extending the inputted video neither in the horizontal nor vertical direction.

In this case, normal videos and squeezed videos with various aspect ratios can be displayed in a central part of the screen as they are.

The video conversion circuit preferably outputs while switching the scaling factors in the horizontal and vertical directions in accordance with an inputted control signal.

In this case, videos can be displayed by easily switching the respective modes.

The aspect ratio of the display unit is preferably 10:3. In this case, powerful videos effectively utilizing the laterally long aspect ratio can be displayed since the horizontal length of the display unit is sufficiently long.

The video conversion circuit preferably includes a mode for extending the inputted video signal at a scaling factor of 8/7 or smaller in the vertical direction.

In this case, subtitles added to most of cinemascope videos and Vista videos entirely fall within the screen even if the cinemascope videos and Vista videos are extended at a scaling factor of 8/7 or smaller in the vertical direction. Thus, subtitles can be displayed without mounting a known subtitle detecting circuit in the video display device.

The video conversion circuit preferably includes a normal mode for extending the inputted video signal neither in the horizontal nor vertical direction; a half/full mode for extending the inputted video signal at a scaling factor of 4/3 only in the horizontal direction; a first zoom mode for extending the inputted video signal at a scaling factor of 128/63 in the horizontal direction and at a scaling factor of 8/7 in the vertical direction; and a second zoom mode for extending the inputted video signal at a scaling factor of 5/2 in the horizontal direction and at a scaling factor of 8/7 in the vertical direction.

In this case, video signals transmitted in various transmission formats can be displayed with accurate circularity and can be displayed at a scaling factor of 4/3 free from incongruous feeling caused by the extension while being viewed. Further, powerful videos can be displayed at a scaling factor of 112/63 (1.78) or 105/64 (1.64) effectively utilizing the display unit with an aspect ratio of 10:3.

It is preferable that a receiving unit for receiving an operation instruction from a user is further provided; and that the video conversion circuit causes the normal mode, half/full mode, first zoom mode and second zoom mode to transit from one to another in accordance with the operation instruction from the user received by the receiving unit.

In this case, a desired screen mode can be easily selected to view the video depending on the video, and modes capable of giving a remarkable sense of presence and modes capable of displaying right circles can be provided only with four modes.

The video conversion circuit preferably includes a normal mode for extending the inputted video signal neither in the horizontal nor vertical direction; a half/full mode for extending the inputted video signal at a scaling factor of 4/3 only in the horizontal direction; a first zoom mode for extending the inputted video signal at a scaling factor of 128/63 in the horizontal direction and at a scaling factor of 8/7 in the vertical direction; a second zoom mode for extending the inputted video signal at a scaling factor of 5/2 in the horizontal direction and at a scaling factor of 8/7 in the vertical direction; and a full mode for extending the inputted video signal at a scaling factor of 5/2 only in the horizontal direction.

In this case, video signals transmitted in various transmission formats can be displayed with accurate circularity and can be displayed at a scaling factor of 4/3 free from incongruous feeling caused by the extension while being viewed. Further, powerful videos can be displayed at a scaling factor of 112/63 (1.78) or 105/64 (1.64) effectively utilizing the display unit with an aspect ratio of 10:3. Further, video signals transmitted in various transmission formats can be displayed as powerful videos effectively utilizing the display unit with an aspect ratio of 10:3 without being cut and, upon operating a menu screen of a video signal source, the menu screen is displayed on the entire display unit with an aspect ratio of 10:3, wherefore very easy operation environments can be provided.

It is preferable that a receiving unit for receiving an operation instruction from a user is further provided; and that the video conversion circuit causes the normal mode, half/full mode, first zoom mode, second zoom mode and full mode to transit from one to another in accordance with the operation instruction from the user received by the receiving unit.

In this case, a desired screen mode can be easily selected to view the video depending on the video, and modes capable of giving a remarkable sense of presence and modes capable of displaying right circles can be provided only with five modes. Further, on a menu screen, very easy operation environments can be provided.

The inputted video signal is preferably any one of a video signal representing a video with a scaling factor of 1 in the horizontal direction and having an aspect ratio of 4:3; a video signal representing a video with a scaling factor of 1 in the horizontal direction and having an aspect ratio of 16:9; a cinemascope video signal representing a video with a scaling factor of 1 in the horizontal direction and having an aspect ratio of 12:5; a squeezed video signal representing a video with a scaling factor of 0.75 in the horizontal direction and having an aspect ratio of 16:9; a squeezed video signal representing a video with a scaling factor of 0.75 in the horizontal direction and having an aspect ratio of 12:5; and a squeezed video signal representing a video with a scaling factor of 0.75 in the horizontal direction and having an aspect ratio of 4:3.

In this case, various video signals transmitted from various video signal sources can be coped with.

The video display device is preferably installed in a vehicle.

In this case, videos easily viewed by passengers in the vehicle can be provided since the display unit has a sufficiently long horizontal length.

The video display device is preferably fixed while being hung from the ceiling of the vehicle between passenger seats of the first row and those of the second row.

In this case, since passengers in the seats of the second row view videos displayed on the video display device, incongruous feeling caused by the extension can be further reduced when videos are viewed, and the laterally long shape of the video display device can prevent the backward vision of a driver of the vehicle via a back mirror from being hindered.

Another video display device according to the present invention comprises a video conversion circuit for extending an inputted video signal at least in a vertical direction; and a display unit including a display screen whose aspect ratio is longer in the horizontal direction than 16:9 and adapted to display the video extended by the video conversion circuit, wherein the video conversion circuit includes a mode for extending the inputted video at a scaling factor of 8/7 in the vertical direction.

In this case, subtitles added to most of cinemascope videos and Vista videos entirely fall within the screen even if the cinemascope videos and Vista videos are extended at a scaling factor of 8/7 in the vertical direction. Thus, subtitles can be displayed without mounting a known subtitle detecting circuit in the video display device.

The aspect ratio of the display unit is preferably 10:3. In this case, powerful videos effectively utilizing the laterally long aspect ratio can be displayed since the horizontal length of the display unit is sufficiently long.

Although the present invention has been described in detail, the above description is only illustrative, but not restrictive. Various improvements and modifications can be made without departing from the scope of the present invention.

What is claimed is:

1. A video display device, comprising:
   a receiver configured to receive an operation instruction from a user,
   a video converter for extending an inputted video in at least one of a horizontal direction and a vertical direction; and
   a display including a display screen whose physical viewable area aspect ratio is longer in the horizontal direction than 16:9 and adapted to display the inputted video extended by the video converter,
   wherein the video converter includes a mode for extending the inputted video at a scaling factor A, which is at least equal to 1 in the horizontal direction and at a scaling factor B, which is at least equal to 1 in the vertical direction; a normal mode for extending the inputted video neither in the horizontal direction nor the vertical direction; a half/full mode for extending the inputted video at a scaling factor of 4/3 only in the horizontal direction; a first zoom mode for extending the inputted video at a scaling factor of 128/63 in the horizontal direction and at a scaling factor of 8/7 in the vertical direction; and a second zoom mode for extending the inputted video at a scaling factor of 5/2 in the horizontal direction and at a scaling factor of 8/7 in the vertical direction, and
   wherein the video converter causes the normal mode, the half/full mode, the first zoom mode and the second zoom mode to transit from one to another in accordance with the operation instruction.

2. A video display device according to claim 1, wherein the scaling factor A in the horizontal direction is larger than the scaling factor B in the vertical direction.

3. A video display device according to claim 1, wherein the video converter includes a plurality of modes for extending the inputted video in the horizontal direction and the vertical direction.

4. A video display device according to claim 3, wherein the video converter further includes a mode for extending the inputted video neither in the horizontal direction nor the vertical direction.

5. A video display device according to claim 1, wherein the scaling factor A in the horizontal direction is determined by dividing a number of pixels of the display in the horizontal direction by a number of pixels of the inputted video in the horizontal direction.

6. A video display device according to claim 1, wherein the video converter further includes a mode for extending the inputted video at a scaling factor C, which is at least equal to 1 only in the horizontal direction.

7. A video display device according to claim 6, wherein the video converter includes a plurality of modes for extending the inputted video only in the horizontal direction.

8. A video display device according to claim 6, wherein the scaling factor C in the horizontal direction is determined by dividing a number of pixels of the display in the horizontal direction by a number of pixels of the inputted video in the horizontal direction.

9. A video display device according to claim 6, wherein the video converter outputs, while switching scaling factors in the horizontal direction and the vertical direction in accordance with an inputted control signal.

10. A video display device according to claim 9, wherein the physical viewable area aspect ratio of the display screen of the display is 10:3.

11. A video display device according to claim 1, wherein the video converter includes a mode for extending the inputted video at a scaling factor of 8/7 or smaller in the vertical direction.

12. A video display device according to claim 1, wherein the video converter further includes a full mode for extending the inputted video at a scaling factor of 5/2 only in the horizontal direction.

13. A video display device according to claim 12,
    wherein the video converter causes the normal mode, the half/full mode, the first zoom mode, the second zoom mode and the full mode to transit from one to another in accordance with the operation instruction.

14. A video display device according to claim 1, wherein the inputted video has one of a videoscaling factor having an aspect ratio of 4:3; a videoscaling factor having an aspect ratio of 16:9; a cinemascope videoscaling factor having an aspect ratio of 12:5; a squeezed videoscaling factor having an aspect ratio of 16:9; a squeezed video signal scaling factor having an aspect ratio of 12:5; and a squeezed video scaling factor having an aspect ratio of 4:3.

15. A video display device, comprising:
    a video converter configured to extend an inputted video in at least one of a horizontal direction and a vertical direction; and a display including a display screen whose physical viewable area aspect ratio is longer in the horizontal direction than 16:9 and adapted to display the inputted video extended by the video converter, wherein the video converter includes a mode for extending the inputted video at a scaling factor A, which is at least equal to 1 in the horizontal direction and at a scaling factor B, which is at least equal to 1 in the vertical direction, wherein the video converter further includes a mode for extending the inputted video at a scaling factor C, which is at least equal to 1 only in the horizontal direction, wherein the video converter outputs, while switching scaling factors in the horizontal direction and the vertical direction in accordance with an inputted control signal, wherein the physical viewable area aspect ratio of the display screen of the display is 10:3, and wherein the video display device is installed in a vehicle.

16. A video display device according to claim 15, wherein the video display device is fixed while being hung from the ceiling of the vehicle.

17. A video display device, comprising:
a receiver configured to receive an operation instruction from a user,
a video converter for extending an inputted video at least in a vertical direction; and
a display including a display screen whose physical viewable area aspect ratio is longer in a horizontal direction than 16:9 and adapted to display the inputted video extended by the video converter, wherein the video converter includes a mode for extending the inputted video at a scaling factor of 8/7 in the vertical direction; a normal mode for extending the inputted video neither in the horizontal direction nor the vertical direction; a half/full mode for extending the inputted video at a scaling factor of 4/3 only in the horizontal direction; a first zoom mode for extending the inputted video at a scaling factor of 128/63 in the horizontal direction and at a scaling factor of 8/7 in the vertical direction; and a second zoom mode for extending the inputted video at a scaling factor of 5/2 in the horizontal direction and at a scaling factor of 8/7 in the vertical direction, and wherein the video converter causes the normal mode, the half/full mode, the first zoom mode and the second zoom mode to transit from one to another in accordance with the operation instruction.

18. A video display device according to claim 17, wherein the physical viewable area aspect ratio of the display screen of the display is 10:3.

* * * * *